United States Patent
Lorincz et al.

(10) Patent No.: US 6,364,260 B1
(45) Date of Patent: Apr. 2, 2002

(54) REUSABLE SINGLE PART BEND TO GRIP PARTITION AND DOOR HARDWARE

(75) Inventors: Eugene M. Lorincz, Cinnaminson; Marlin J. Hoskinson, Delran, both of NJ (US)

(73) Assignee: Moore Push-Pin Company, Wyndmoor, PA (US)

( * ) Notice: Subject to any disclaimer, the term of this patent is extended or adjusted under 35 U.S.C. 154(b) by 0 days.

(21) Appl. No.: 09/031,151

(22) Filed: Feb. 26, 1998

(51) Int. Cl.[7] .............................................. A47B 96/06
(52) U.S. Cl. ...................... 248/215; 248/214; 248/215; 248/301; 248/909; 211/113
(58) Field of Search .................... 248/215, 301, 248/909, 214, 60, 62, 74.1, 74.3; 211/113; 24/16 R

(56) References Cited

U.S. PATENT DOCUMENTS

| | | | |
|---|---|---|---|
| 275,723 A | * 4/1883 | Smith | 24/16 R |
| 873,488 A | 12/1907 | De Beaumont et al. | |
| 1,334,891 A | 3/1920 | Cutting | |
| 1,726,316 A | 8/1929 | Saxton | |
| 1,915,958 A | 6/1933 | Skirrow | |
| 2,157,001 A | 5/1939 | Morley | 248/206 |
| 2,225,060 A | * 12/1940 | Lindley | 206/44 |
| 2,447,128 A | 8/1948 | Logan | 248/290 |
| 2,743,023 A | 4/1956 | Larson | 211/96 |
| 2,918,244 A | 12/1959 | Laney | 248/214 |
| 2,955,794 A | 10/1960 | Robbins | 248/263 |
| 3,022,557 A | 2/1962 | Logan | 24/17 |
| 3,099,054 A | * 7/1963 | Spiro | 24/16 |
| 3,536,287 A | 10/1970 | Kramer | 248/301 |
| 3,578,282 A | 5/1971 | Olsen | 248/214 |
| 3,907,118 A | 9/1975 | Pelavin | 211/113 |
| 3,913,178 A | * 10/1975 | Ballin | 24/16 |
| 4,483,501 A | * 11/1984 | Eddy | 248/205.1 |
| 4,532,679 A | 8/1985 | Scott | 24/16 PB |
| 4,846,430 A | * 7/1989 | Ke | 248/215 |
| 4,865,237 A | 9/1989 | Allen | 224/42.45 R |
| 4,893,773 A | 1/1990 | Fujimoto | 248/311.2 |
| 4,894,935 A | 1/1990 | Kretz | 38/137 |
| D306,544 S | 3/1990 | Anderson | D7/620 |
| 4,944,005 A | * 7/1990 | Van Dyke | 379/449 |
| 4,944,683 A | * 7/1990 | Leonardo | 439/96 |
| 4,971,279 A | 11/1990 | George | 248/214 |
| 4,978,092 A | 12/1990 | Nattel | 248/205.1 |
| 5,014,948 A | 5/1991 | Asaro et al. | 248/215 |
| 5,144,709 A | * 9/1992 | Rooney | 7/335 |
| 5,177,929 A | * 1/1993 | Reynolds | 52/741 |
| 5,209,444 A | 5/1993 | Rinderer | 248/205.1 |
| 5,246,190 A | 9/1993 | Swirkal | 248/100 |
| 5,257,439 A | * 11/1993 | LeBlanc | 24/269 |
| 5,333,744 A | 8/1994 | LoCicero et al. | 211/87 |
| 5,361,950 A | 11/1994 | Signal et al. | 224/151 |
| 5,485,932 A | 1/1996 | Romm et al. | 211/87 |
| 5,816,543 A | * 10/1998 | Krauss | 248/73 |

FOREIGN PATENT DOCUMENTS

| | | | | |
|---|---|---|---|---|
| GB | 2018581 | * | 10/1979 | |
| IT | 707587 | * | 5/1966 | 24/16 R |

* cited by examiner

Primary Examiner—Anita King
(74) Attorney, Agent, or Firm—Woodcock Washburn LLP

(57) ABSTRACT

A gripping and fastening device comprising a bendable strip of material having integral slots is provided. The strip can have a formed hook or hanging shape for holding or hanging articles. The strip can be bent through at least one of the slots to grip the upper edge of a structure such as a wall partition or door, or other article. The integral slots allow for multiple repeated bending and unbending of the strip while preventing or delaying the material from work hardening through the bending area, and thus, fracturing. When straightened, the device retains its original shape. Preferably, there is no indication that bending has occurred. Preferably, the slots are rectangular shaped, but other slot shapes can be used, such as dog bone shaped slots.

28 Claims, 7 Drawing Sheets

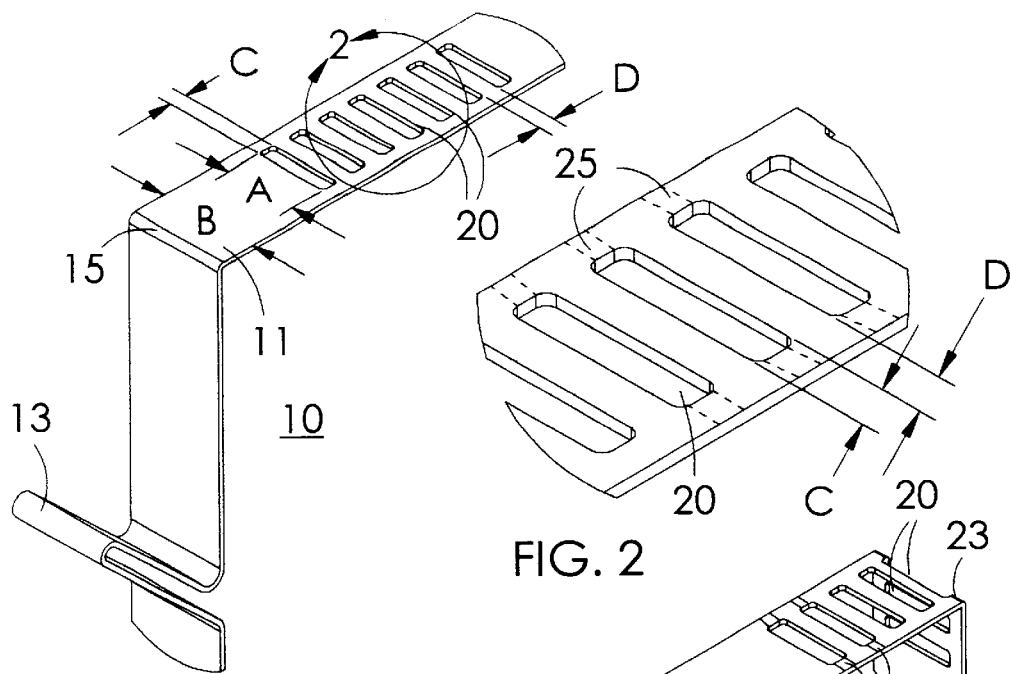
FIG. 1
FIG. 2
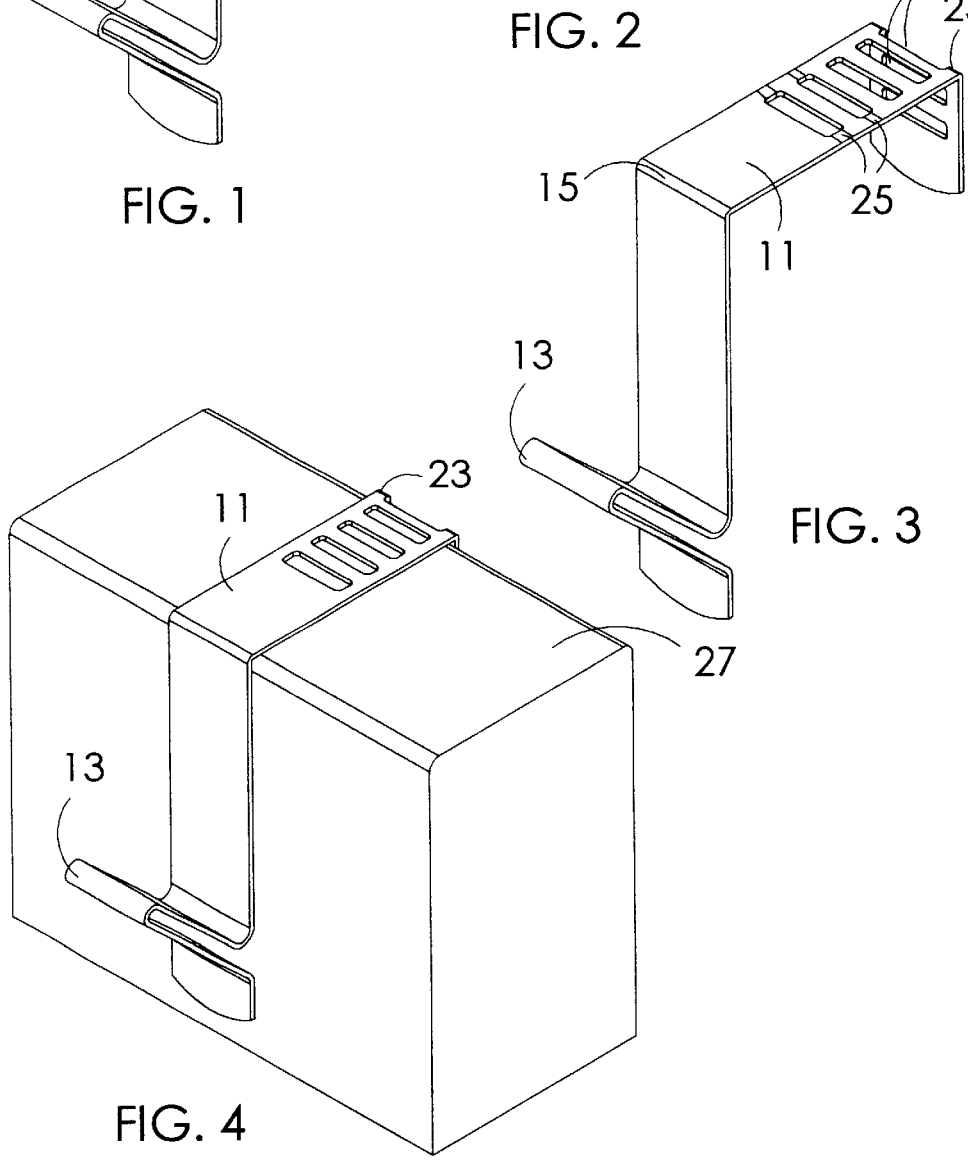
FIG. 3
FIG. 4

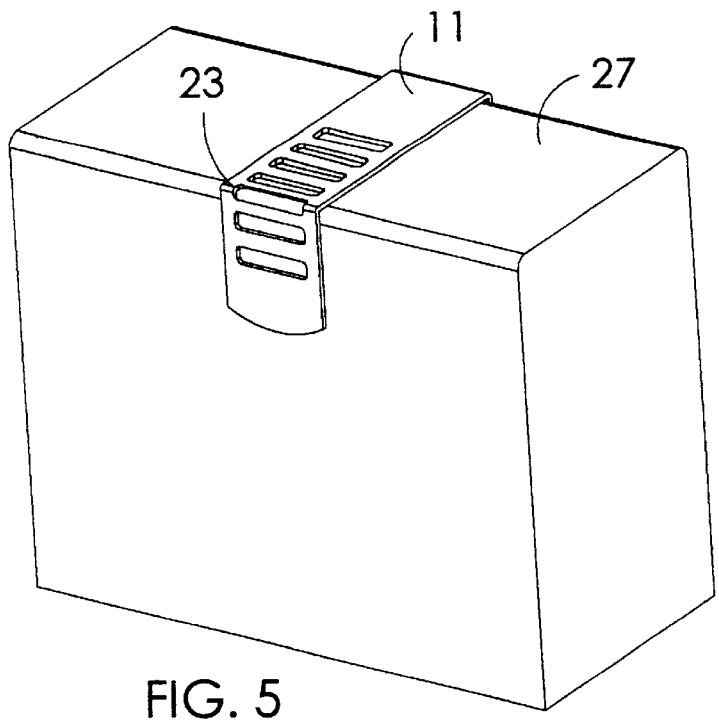
FIG. 5
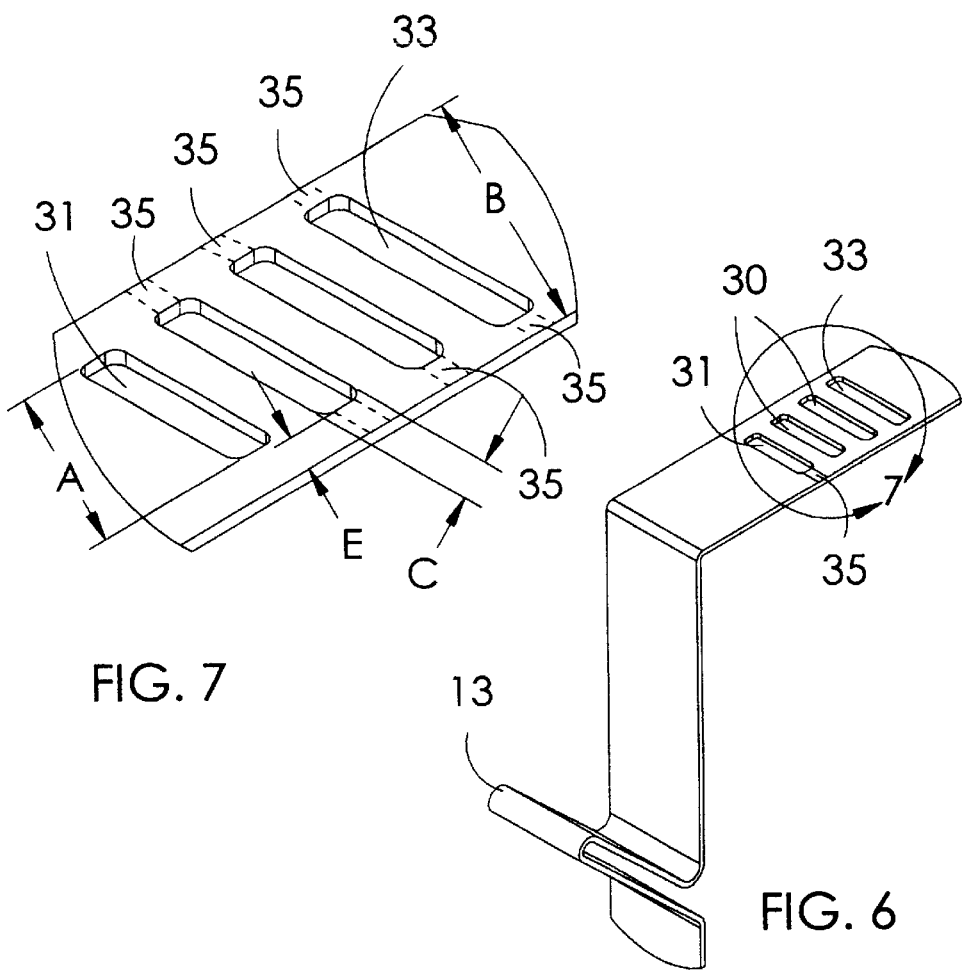
FIG. 7
FIG. 6

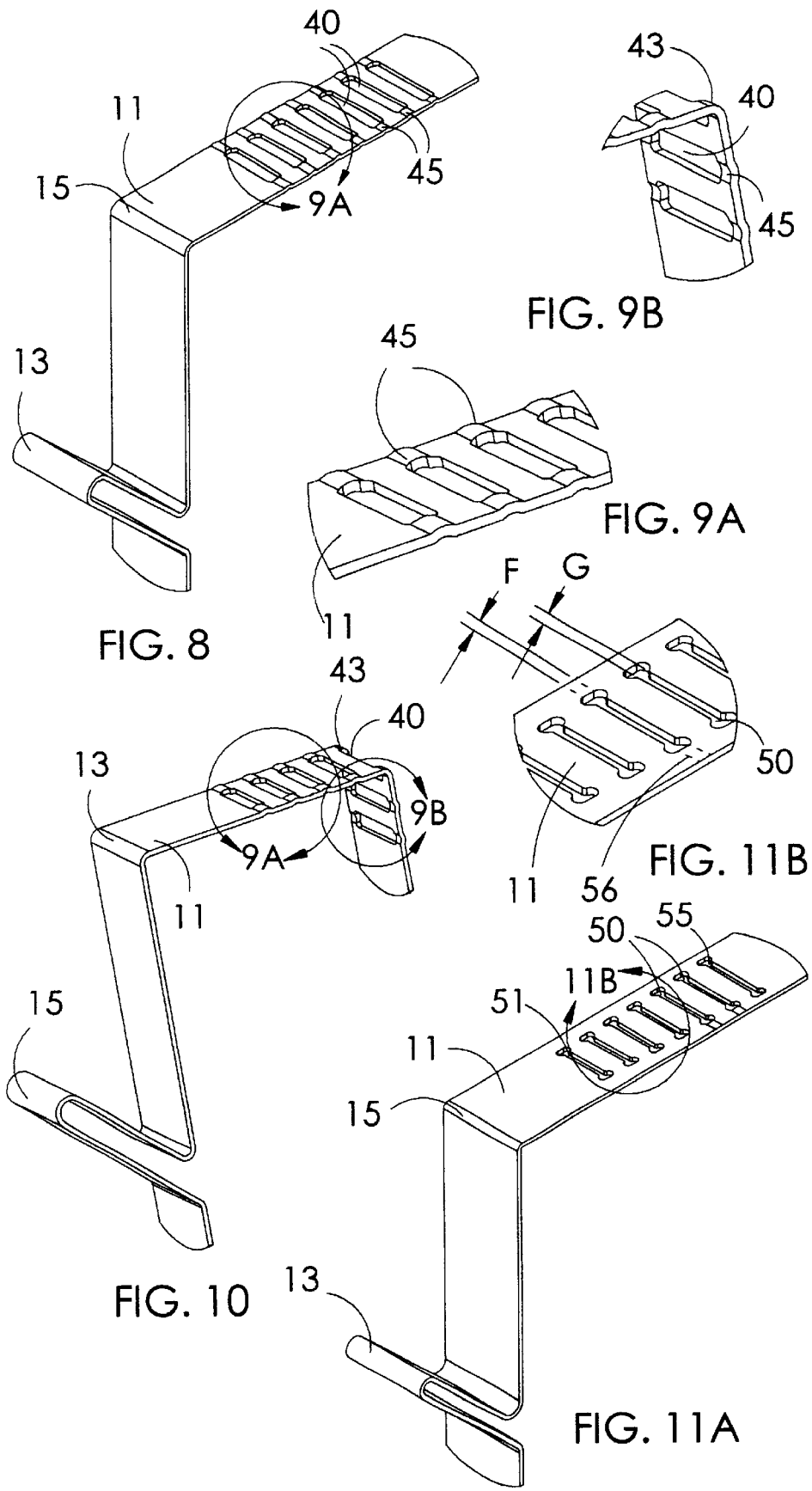

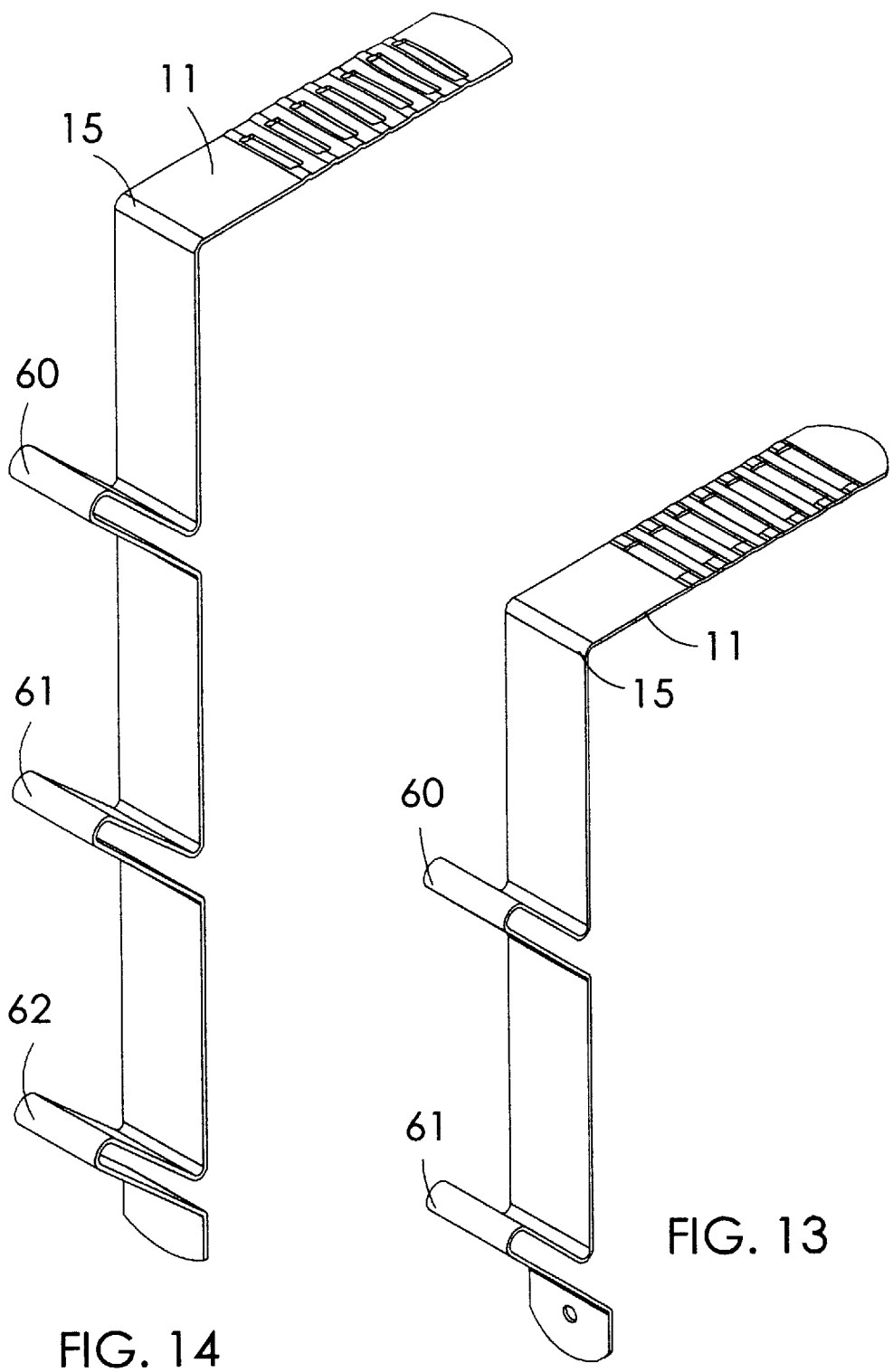

REUSABLE SINGLE PART BEND TO GRIP PARTITION AND DOOR HARDWARE

FIELD OF THE INVENTION

The present invention relates in general to a gripping and fastening device. More particularly, the present invention relates to a device having a flexible strip of material that can be repeatedly bent and unbent to grip a structure or article.

BACKGROUND OF THE INVENTION

The prior art is replete with devices for holding articles, hanging devices, fixtures for supporting hooks and hangers, and devices for gripping and fastening about a structure. Many of the prior art devices have been formed of strips of material. However, they have not been highly repeatedly bendable and unbendable in order to retain an original shape. Instead, they have been either rigid devices, such as that disclosed in U.S. Pat. No. 1,726,316, or formed of an elastic strip that fails or breaks after only a few cycles of bending and unbending.

The flexible devices disclosed in U.S. Pat. Nos. 4,978,092 and 5,361,950 use score lines to allow for bending and unbending of a strip of material. The flexible device disclosed in U.S. Pat. No. Des. 306,544 uses V-shaped grooves to allow for bending and unbending. Score lines and grooves in a material concentrate the bending into a very small area, thereby localizing a high stress concentration. This results in the disadvantage of rapid failure during bending and unbending.

The flexible device disclosed in U.S. Pat. No. 5,209,444 has radius or rounded end bend slots. These slots concentrate the bending into a very small area, which results in a high stress concentration and thus, rapid fracture and failure.

Although the art of gripping and fastening devices is well developed, there remain some problems inherent in this technology, particularly the rapid failure after only a few cycles of bending and unbending. Therefore, a need exists for a gripping and fastening device that is highly repeatedly bendable and unbendable and overcomes the drawbacks of the prior art.

SUMMARY OF THE INVENTION

The present invention is directed to a gripping and fastening device for attaching to a structure. The device comprises a strip of material having a plurality of slots and a bend. The slots are disposed on one side of the bend, and the strip of material is bent through one of the slots such that the bend and the bent slot releasably support the device from the structure.

According to one aspect of the present invention, the slots are substantially rectangular shaped and are substantially equal in length. According to another aspect, the slots are dog bone shaped.

According to another aspect of the present invention, the lengths of the slots progressively increase as the distance of the slot from the bend increases.

According to another aspect of the present invention, an article carrying means is disposed on the strip of material for carrying an article. The article carrying means preferably comprises at least one of a hook, a loop, and an eyelet.

In accordance with a further aspect of the present invention, preformed areas are formed in an area between the edges of the slots and the associated edge of the strip of material. Preferably, the preformed areas are raised.

In a further embodiment within the scope of the present invention, a flexible connector is provided for holding at least one article. The flexible connector comprises a strip of material having slots, preferably substantially rectangular or dog bone shaped. The strip of material is bent through at least one of the slots such that the at least one bent slot releasably holds the at least one article.

According to one aspect of the present invention, the flexible connector can be configured such that it can be doubled back on itself to form a loop.

According to another aspect of the present invention, the strip of material is bent through at least two of the slots such that the at least two bent slots releasably hold the at least one article between the at least two bent slots, and the flexible connector further comprises article carrying means disposed towards the ends of the strip of material.

The foregoing and other aspects of the present invention will become apparent from the following detailed description of the invention when considered in conjunction with the accompanying drawing.

BRIEF DESCRIPTION OF THE DRAWING

FIG. 1 is a perspective view of an exemplary gripping and fastening device in accordance with the present invention, in an unbent state;

FIG. 2 is a detailed view of a slotted portion of the device of FIG. 1;

FIG. 3 is a perspective view of the device of FIG. 1, in a bent state;

FIG. 4 is a first perspective view of the device of FIG. 1, in a bent state, as implemented with an edge of a structure;

FIG. 5 is a second perspective view of the device of FIG. 1, in a bent state, as implemented with an edge of a structure;

FIG. 6 is a perspective view of a second exemplary gripping and fastening device in accordance with the present invention, in an unbent state;

FIG. 7 is a detailed view of a slotted portion of the device of FIG. 6;

FIG. 8 is a perspective view of a further exemplary gripping and fastening device in accordance with the present invention, in an unbent state;

FIGS. 9A and 9B are detailed views of slotted portions of the device of FIGS. 8 and 10;

FIG. 10 is a perspective view of the device of FIG. 8, in a bent state;

FIG. 11A is a perspective view of a further exemplary gripping and fastening device in accordance with the present invention, in an unbent state;

FIG. 11B is a detailed view of a slotted portion of the device of FIG. 11A;

FIGS. 13–17 are perspective views of further exemplary article hangers and holders in accordance with the present invention;

DESCRIPTION OF EXEMPLARY EMBODIMENTS AND BEST MODE

Figure 12A:
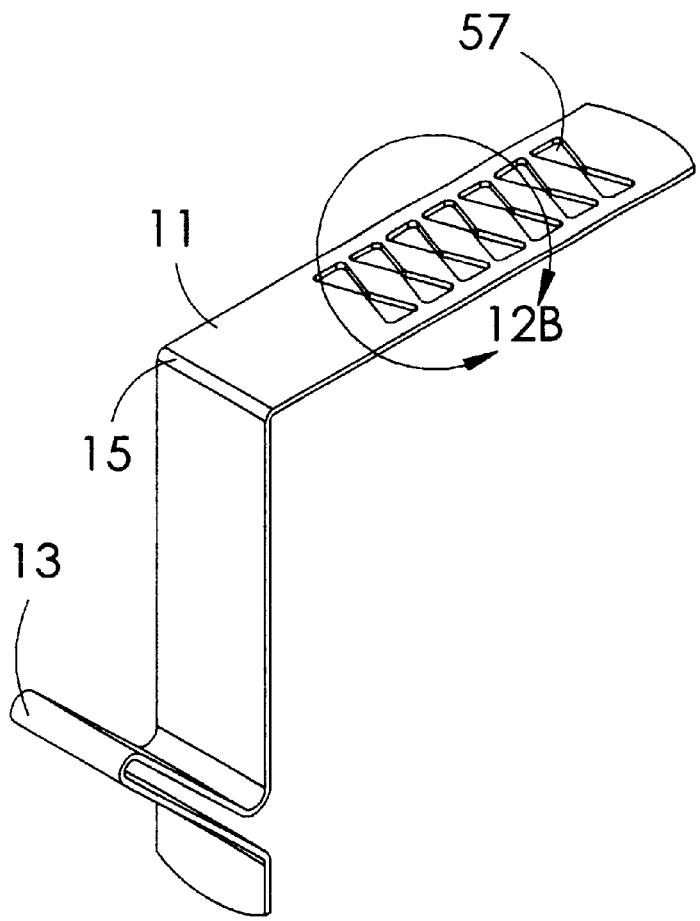
FIG. 12A is a perspective of a further exemplary gripping and fastening device in accordance with the present invention, in an unbent state.

The present invention is directed to a gripping and fastening device comprising a bendable strip of material having integral slots. The strip can have a formed hook or hanging shape for holding or hanging articles. The strip can be bent through at least one of the slots to grip the upper edge of a structure such as a wall partition or door, or other article. The integral slots allow for multiple repeated bending and unbending of the strip while preventing or delaying the material from work hardening through the bending area, and thus, fracturing. When straightened, the device retains its original shape. Preferably, there is no indication that bending has occurred. Preferably, the slots are substantially rectangular shaped (herein below described as "rectangular", and meaning to include "substantially rectangular"), but other slot shapes can be used, such as dog bone shaped slots.

FIG. 1 is a perspective view of an exemplary gripping and fastening device 10 in accordance with the present invention, in an unbent state, and FIG. 2 is a detailed view of a slotted portion of the device of FIG. 1. A formed hook 13 and a bend 15 are disposed at one end of a strip of material 11. A plurality of rectangular shaped slots 20 are formed in the strip of material 11, preferably in a regularly spaced arrangement, on one side of the bend 15, preferably opposite the side on which the hook 13 is disposed. The slots 20 each have a substantially equal length A which is preferably between about 60% and about 90% of the width B of the strip of material 11. The slots 20 have a width C that is preferably about 25% of the length A of the slots 20. The slots 20 are spaced apart a distance D, which is can be any distance, but preferably is in the range 10 between about 0.01 inch and about 6 inches, and more preferably, about ¼ inch.

Although it is desirable that the rectangular slots have sharp 90° degree angle corners, the fabrication process can introduce a curved radius along the corners of the slots. It is desirable to minimize the curvature of the corners, preferably so that at least about 75% of the width C of the slots is linear and not curved, more preferably that at least about 90% of the width C of the slots is linear and not curved, and most preferably that about 100% of the width C of the slots is linear and not curved.

FIG. 3 shows the device of FIG. 1 bent through one of the rectangular slots 20. By bending through one of the slots 20, the device can be affixed to grip or fasten to a structure, such as the top of a door or wall partition. Although the bend 23 can be any angle, FIG. 2 shows the bend 23 being approximately 90° degrees. Bending occurs through at least one of the rectangular slots 20 and over the total area of the ends 25, as shown by the dotted lines. This allows for the bending to occur over a large section of the hanging device 10, thereby substantially eliminating a concentration of stress. This, in turn, allows the device to be repeatedly bent and unbent through any of the slots 20 many times without the material in the ends 25 work hardening, and thus fracturing or failing.

FIG. 4 is a first perspective view of the device of FIG. 1, in a bent state, as implemented with an edge of a structure 27. In other words, FIG. 4 is a perspective view of the device of FIG. 1, in a bent state, for a contemplated use, such as gripping the top edge of a wall or partition door 27. By bending the device through the appropriate slot 20 to result in a bend 23, the device can firmly grip or attach itself to the structure 27. The hook 13 can then be used to hang an article, such as an article of clothing or a piece of artwork.

FIG. 5 shows a second perspective view of the device of FIG. 1 as a back view of FIG. 4. The appropriate slot 20 is bent approximately 90° degrees around the top edge of the structure 27 to firmly grip the structure 27. When it is desired to remove the device from the structure 27, the strip of material 11 is unbent through the slot 20 that was bent. The strip of material 11 preferably retains its original, unbent shape without the material substantially work hardening and weakening. Thus, the device can be highly repeatedly bent and unbent (e.g., preferably at least 50 times, and more preferably at least 250 times) without failure.

The material is preferably annealed 300 series stainless steel, but any material that is bendable or ductile and resists work hardening can be used, such as, but not limited to, 300 and 400 series stainless steel, low carbon steel, copper, brass, bronze, aluminum, and magnesium strip stock, all preferably in annealed or ¼ hard temper. It is also contemplated that plastic can be used as the material. The thickness of the material is such that it is sufficient to allow bending and unbending, preferably in the range between about 0.01 inch and about 0.100 inch, and more preferably, in the range between about 0.030 inch and 0.040 inch.

For the gripping and fastening device 10 to remain in its gripping position, the material in the area 25 outside of the rectangular slot being bent is desirably bent beyond the yield point of the material. It should be noted that repeated bending of the material beyond its yield point causes the material to cold work and harden, thus making the material brittle. In using the present invention, the material is stressed beyond its yield point repeatedly. To bend and straighten the hanging device many times, it is desirable to maintain the plasticity of the material as long as possible before reaching its breaking strength. It should be noted that after the device has been repeatedly bent and unbent, but prior to failure of the material due to work hardening, the device can be annealed to remove the accumulated effects of work hardening. The annealing prolongs the life of the device even longer.

FIG. 6 is a perspective view of another exemplary gripping and fastening device in accordance with the present invention, in an unbent state. FIG. 7 is a detailed view of a slotted portion of the device of FIG. 6. FIGS. 6 and 7 contain elements similar to those described above with respect to FIG. 1. These elements are labeled identically and their description is omitted for brevity.

In the exemplary device, the slots 30 get progressively longer in length as their distance from the bend 15 increases. For example, slot 31 has a shorter length than slot 33. Shorter slots are stiffer which lead to an easier bending and unbending of the longer slots in the device. It should be noted that the width C of the slots is the primary factor in leading to failure. The material at the end of the slots in areas 35 gets work hardened at the same time and will ultimately fail at the same time. Thus, the length E (which equals the width B of the material strip minus the length A of the slot) of the material at the end of the slots is not a primary factor in failure.

FIG. 8 is a perspective view of another exemplary gripping and fastening device in accordance with the present invention, in an unbent state, and FIGS. 9A and 9B are detailed views of slotted portions of the device of FIGS. 8 and 10. As described in further detail below, FIG. 10 shows the device of FIG. 8 bent through one of the rectangular slots.

FIGS. 8–10 contain elements similar to those described above with respect to FIG. 1. These elements are labeled identically and their description is omitted for brevity.

The exemplary device of FIG. 8 incorporates preformed areas 45 with the rectangular slots described above. In FIG. 8, a series of rectangular shaped slots 40 are formed in the strip of material 11. Similar to the slots 30 described above with respect to FIG. 6, the slots 40 get progressively longer in length as their distance from the bend 15 increases. Moreover, the preformed areas 45, as shown in further detail in FIG. 9A, are formed between the two shorter edges of the slot and the sides of the strip of material 11. The preformed areas 45 are preferably raised areas that are formed after the slots are formed in the material. Preferably the slots are punched into the material, and the preformed areas are then formed in a stamping operation. The preformed areas preferably have a raised peak height in the range between about 0.005 inches and about 0.040 inches, and more preferably, between about 0.010 inches and about 0.020 inches.

FIG. 10 shows the device of FIG. 8 bent through one of the rectangular slots 40, similar to FIG. 3. Although the bend 43 can be any angle, FIG. 10 shows the bend 43 being approximately 90° degrees. Bending occurs through at least one of the rectangular slots 40 and over the total area of the associated preformed areas 45, as shown in further detail in FIG. 9B. This allows for the bending to occur over a large section of the hanging device with no stress concentration.

For the hanging device to remain in its gripping position, the material in the preformed areas 45 of the associated rectangular preformed slots 40 is desirably bent beyond the yield point of the material. As described above, repeated bending of the material beyond its yield point causes the material to cold work and harden, thus making the material brittle. In using the present invention, the material is stressed beyond its yield point repeatedly. To bend and straighten the hanging device many times, it is desirable to maintain the plasticity of the material as long as possible before reaching its breaking strength.

It should be noted that the above described preformed areas can be used with the embodiment described with respect to FIG. 1; namely, a gripping and fastening device having slots that are substantially equal in length.

FIG. 11A is a perspective view of another exemplary gripping and fastening device in accordance with the present invention, in an unbent state, and FIG. 11B is a detailed view of a slotted portion of the device of FIG. 11A.

FIGS. 11A and 11B contain elements similar to those described above with respect to FIG. 1. These elements are labeled identically and their description is omitted for brevity.

The exemplary gripping and fastening device shown in FIG. 11A uses dog bone shaped slots 50, as opposed to the rectangular slots described in the above embodiments. The length of the dog bone shaped slots 50 can remain constant (not shown) or progressively increase, as shown, with, for example, a slot 51, closer to the bend 15, having a smaller length than a slot 55, farther from the bend 15. Preformed areas, as described above, can also be used in conjunction with the dog bone shaped slots 50, although this is not shown.

Bending occurs between the dotted lines 56 as shown in FIG. 11B, and through the open area of the dog bone shape.

The ends of the dog bone shape are straight for a distance F equal to at least the width G of the slot. This allows for the bending to occur over a section of the hanging device with less stress concentration.

Figure 12B:
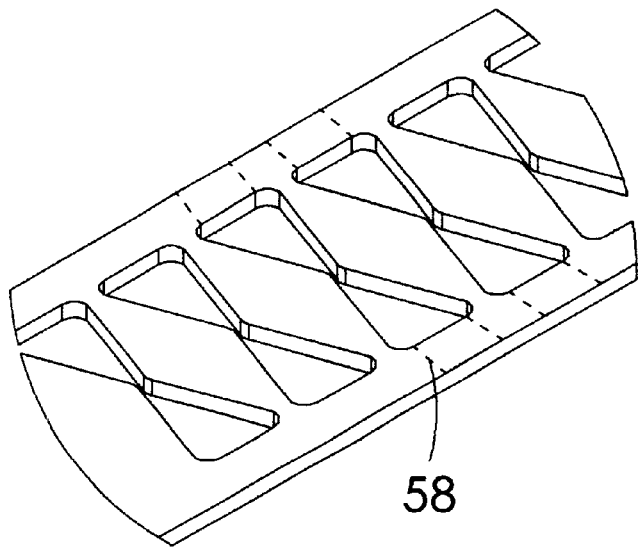
FIG. 12B is a detailed view of a slotted portion of the device of FIG. 12A.

FIG. 12A is a perspective view of another exemplary gripping and fastening device in accordance with the present invention, in an unbent state, and FIG. 12B is a detailed view of a slotted portion of the device of FIG. 12A.

FIGS. 12A and 12B contain elements similar to those described above with respect to FIG. 1. These elements are labeled identically and their description is omitted for brevity.

The exemplary gripping and fastening device shown in FIG. 12A uses butterfly shaped slots 57. The length of the butterfly shaped slots 57 can remain constant as shown or progressively increase (not shown) as the slots get farther from the bend 15. Preformed areas, as described above, can also be used in conjunction with the butterfly shaped slots 57, although this is not shown.

Bending occurs between the dotted lines 58 as shown in FIG. 12B, and through the open area of the butterfly shape. This allows for the bending to occur over a section of the hanging device with less stress concentration.

Figure 15:
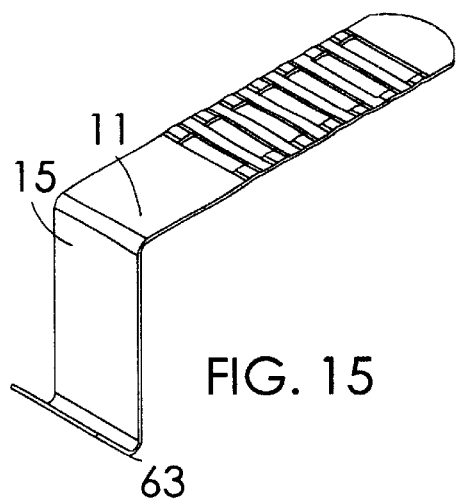
Figure 16:
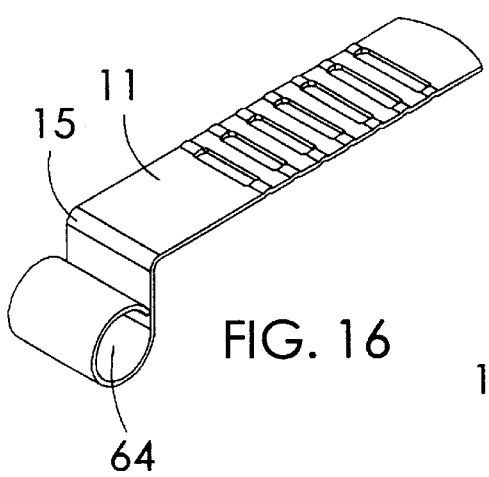
Figure 17:
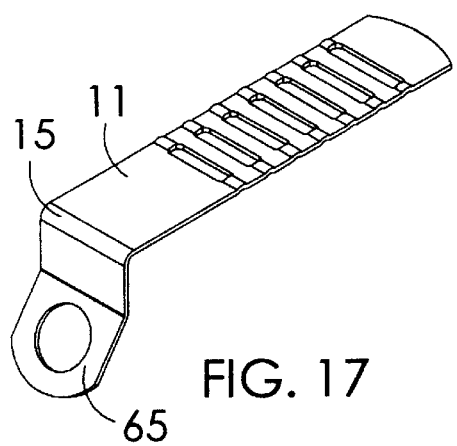

Although the above described exemplary embodiments showed a single supported hook 13, other article carrying means or attachment devices can be used in accordance with the present invention, including, but not limited to, multiple supported hooks 60–62 as shown in FIGS. 13 and 14, a single unsupported hook 63 as shown in FIG. 15, multiple unsupported hooks (not shown), a single unsupported loop 64 as shown in FIG. 16, and an eye 65 as shown in FIG. 17. These devices are merely intended to be representative and any other supporting or attachment device or devices or combinations thereof can be used. Although these devices are shown used in accordance with an embodiment having progressively widening rectangular slots with preformed areas, similar to the embodiment described above with respect to FIG. 8, these devices can be used with any of the above described embodiments.

Figure 18:
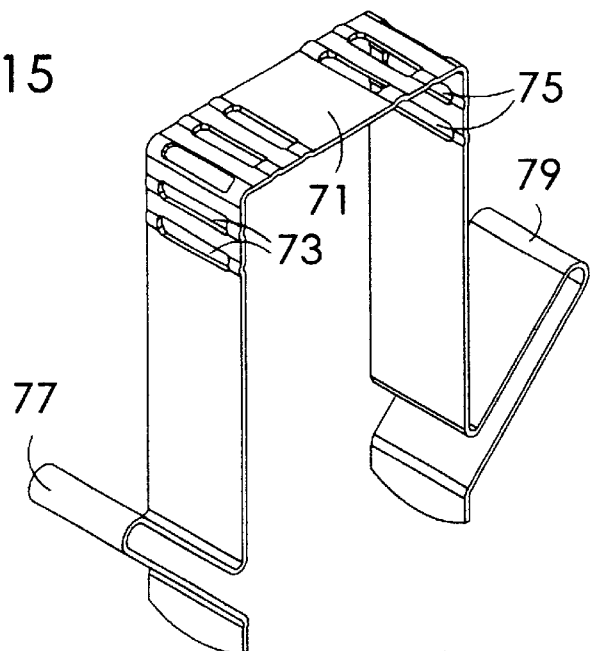
FIG. 18 is a perspective view of a further exemplary gripping and fastening device in accordance with the present invention.

FIG. 18 shows another exemplary gripping and fastening device in accordance with the present invention. A strip of material 71 has two sets of slots 73 and 75. The strip of material 71 is bent through one slot of the set of slots 73 and one slot of the set of slots 75. Attachment devices such as hooks 77 and 79 are disposed towards both ends of the strip of material 71. In this manner, the gripping and fastening device grips a structure (not shown, similar to structure 27 in FIG. 4) and provides an attachment device on both sides of the structure. It should be noted that although rectangular slots of equal length with preformed areas are shown in FIG. 18, any slot shape herein described can be used, such as dog bone shaped or butterfly shaped, and the areas between the edges of the slots and the edge of the strip of material can be preformed as described above or not preformed. Moreover, the slots can increase in length as their distance from the center of the strip of material 71 increases. Also, the invention is not limited to the attachment devices shown, but any attachment device or combination of such devices herein described can be used.

Figure 19:
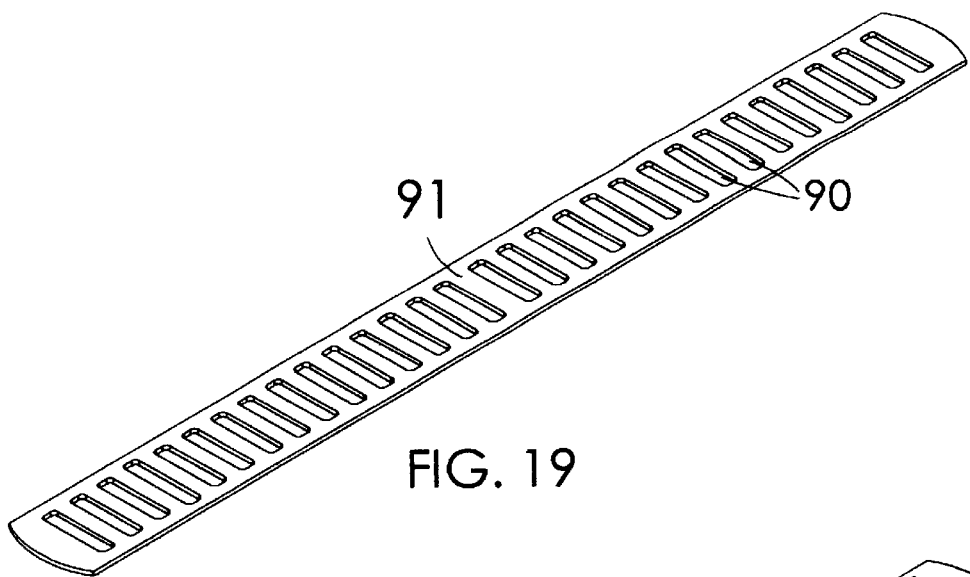
FIG. 19 is a perspective view of a further exemplary gripping and fastening device in accordance with the present invention.

FIG. 19 shows another exemplary gripping and fastening device in accordance with the present invention. A strip of material 91 is used as a tie and is shown with rectangular slots 90 having a substantially equal length and not having preformed areas. The strip of material 91 does not have any attachment devices such as a hook or hanging shape 13 and has no preformed bend 15. The tie can be wrapped around objects and twisted to attach items together or to hold an item or article by bending through at least one of the slots 90.

Figure 20:
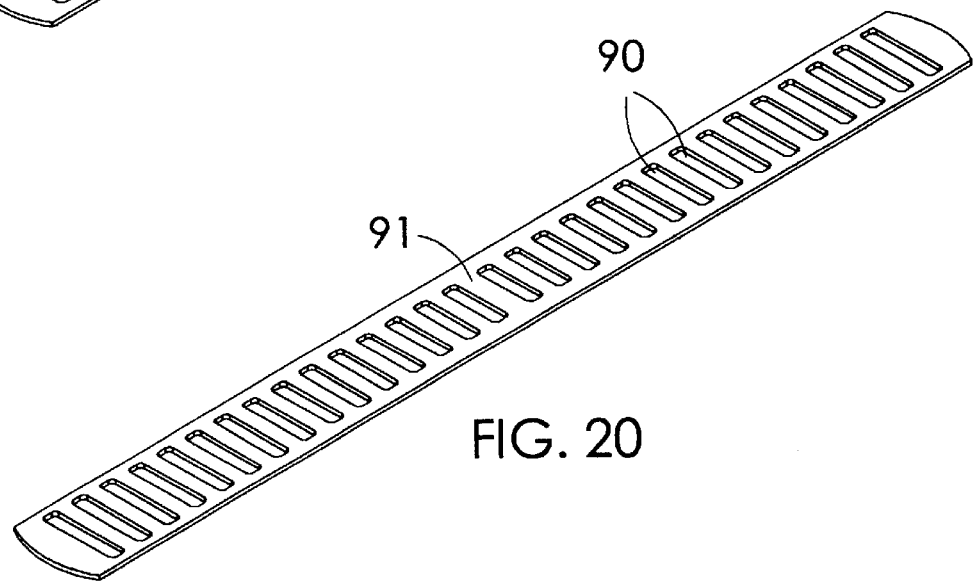
FIG. 20 is a perspective view of a further exemplary gripping and fastening device in accordance with the present invention.

FIG. 20 shows a further exemplary gripping and fastening device in accordance with the present invention. This embodiment is similar to that described above with respect to FIG. 19; however, the lengths of the rectangular slots 90 progressively increase from the center of the strip of material 91 to the ends of the strip of material 91. The advantages of the progressive length increase are described above with respect to FIG. 6.

Figure 21:
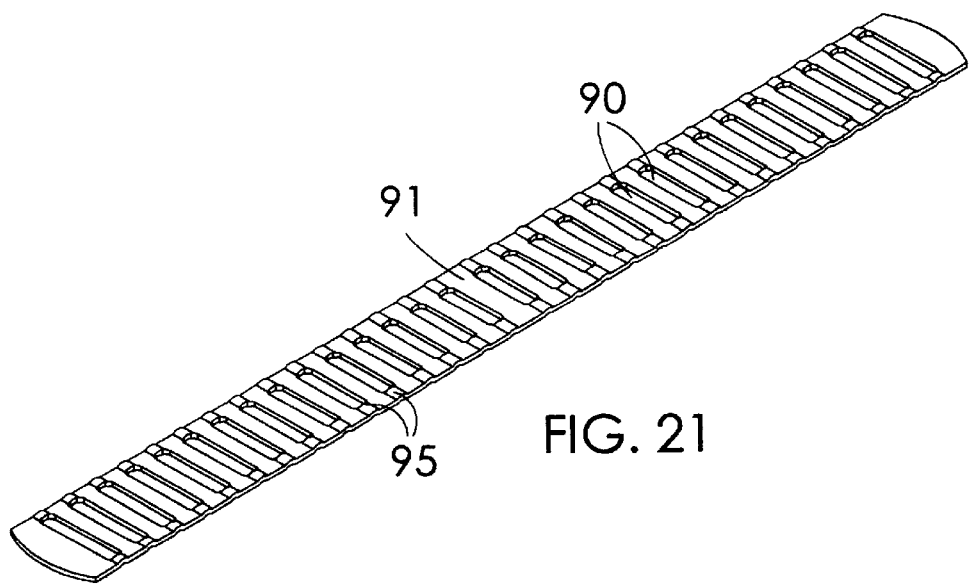
FIG. 21 is a perspective view of a further exemplary gripping and fastening device in accordance with the present invention.

FIG. 21 shows a further exemplary gripping and fastening device in accordance with the present invention. In this embodiment, the lengths of the rectangular slots 90 progressively increase from the center of the strip of material 91 to the ends of the strip of material 91, as in the embodiment shown in FIG. 20, and, in addition, preformed areas 95 are added. The advantages of the preformed areas are described above with respect to FIG. 8.

It should be noted that other shapes, such as a butterfly shape or a dog bone shape, can be used for the slots in the above described embodiments, in addition to the rectangular shaped slots. Preferably, the shapes of the slots have an edge width that is greater than the width of the slot at its center portion. Also, preformed areas could be used in conjunction with these shapes, and these shapes can progressively increase in length, as described above.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A gripping and fastening device for attaching to a structure comprising:
   a single strip of ductile material not subject to work hardening having a bend and a plurality of integral portions disposed on one side of said bend, each portion including only a single slot, said strip of material being repeatedly bendable through one of said portions such that said bend and said bent portion releasably support said device from said structure.

2. The gripping and fastening device according to claim 1, wherein said slots are substantially equal in length.

3. The gripping and fastening device according to claim 1, wherein each of said slots has a length, said respective lengths progressively increasing as the distance of said respective slot from said bend increases.

4. The gripping and fastening device according to claim 1, further comprising an article carrying means disposed on the other side of said bend for carrying an article.

5. The gripping and fastening device according to claim 4, wherein said article carrying means comprises at least one of a hook, a loop, and an eyelet.

6. The gripping and fastening device according to claim 5, wherein said slots are substantially equal in length.

7. The gripping and fastening device according to claim 5, wherein each of said slots has a length, said respective lengths progressively increasing as the distance of said respective slot from said bend increases.

8. The gripping and fastening device according to claim 1, further comprising a plurality of preformed areas, each preformed area being formed in an area of the portion between an edge of one of said slots and an associated edge of said strip of material.

9. The gripping and fastening device according to claim 8, wherein said preformed areas are raised.

10. The gripping and fastening device according to claim 1, wherein said strip of material comprises stainless steel.

11. The gripping and fastening device according to claim 1, wherein said slots are dog bone shaped.

12. The gripping and fastening device according to claim 1, wherein said slots have an edge width that is greater than a center width.

13. The gripping and fastening device according to claim 1, wherein said slots have an edge that is substantially linear.

14. The gripping and fastening device according to claim 1, wherein said slots are rectangular shaped.

15. The gripping and fastening device according to claim 1, wherein said strip of material between said bend and said plurality of portions is planar.

16. The gripping and fastening device according to claim 1, wherein each of said portions comprises an area between a slot edge and an associated edge of said strip of material.

17. A flexible connector for holding at least one article comprising a single strip of ductile material not subject to work hardening having a plurality of integral portions each including only a single slot, said strip of material being repeatedly bendable through one of said portions such that said bend releasably holds said at least one article.

18. The flexible connector according to claim 17, wherein said flexible connector can be configured such that it can be doubled back on itself to form a loop.

19. The flexible connector according to claim 17, wherein said slots are substantially equal in length.

20. The flexible connector according to claim 17, wherein each of said slots has a length, said respective lengths progressively increasing as the distance of said respective slot from the center of said strip of material increases.

21. The flexible connector according to claim 17, further comprising a plurality of preformed areas, each preformed area being formed in an area of the portion between an edge of one of said slots and an associated edge of said strip of material.

22. The flexible connector according to claim 21, wherein said preformed areas are raised.

23. The flexible connector according to claim 17, wherein said strip of material comprises stainless steel.

24. The flexible connector according to claim 17, wherein said slots are dog bone shaped.

25. The flexible connector according to claim 17, wherein said strip of material is repeatedly bendable through at least two of said portions such that said at least two bent portions releasably hold said at least one article between said at least two bent portions, further comprising article carrying means disposed towards the ends of said strip of material.

26. The flexible connector according to claim 17, wherein said slots are rectangular shaped.

27. The flexible connector according to claim 17, wherein each of said portions comprises an area between a slot edge and an associated edge of said strip of material.

28. A gripping and fastening device for attaching to a structure comprising:
   a single strip of ductile material having a bend, a plurality of integral portions disposed on one side of said bend, each portion including only a single slot, and a plurality of areas, each area being disposed between an edge of one of said slots and an associated edge of said strip of material to substantially eliminate a concentration of stress, said strip of material being repeatedly bendable through one of said portions such that said bend and said bent portion releasably support said device from said structure.

* * * * *